No. 812,249. PATENTED FEB. 13, 1906.
J. WILENTZ.
KEROSENE LAMP.
APPLICATION FILED MAY 2, 1905.
2 SHEETS—SHEET 2.
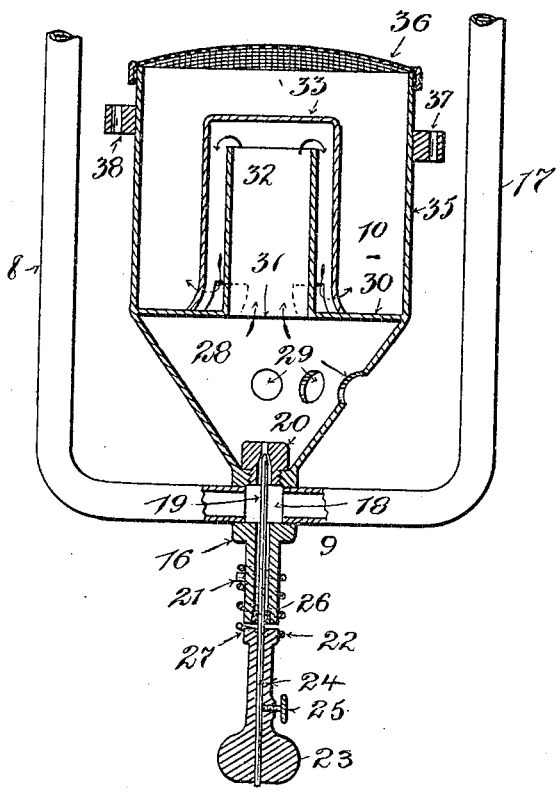
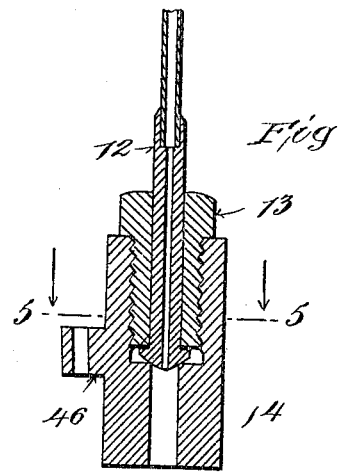
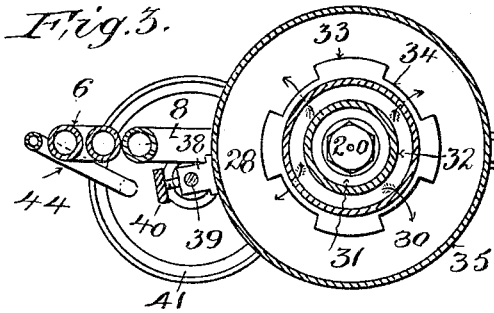
Witnesses
C. W. Benjamin
Richard M. Glide
Inventor
Jacob Wilentz
By his Attorney Benedict S. Wise

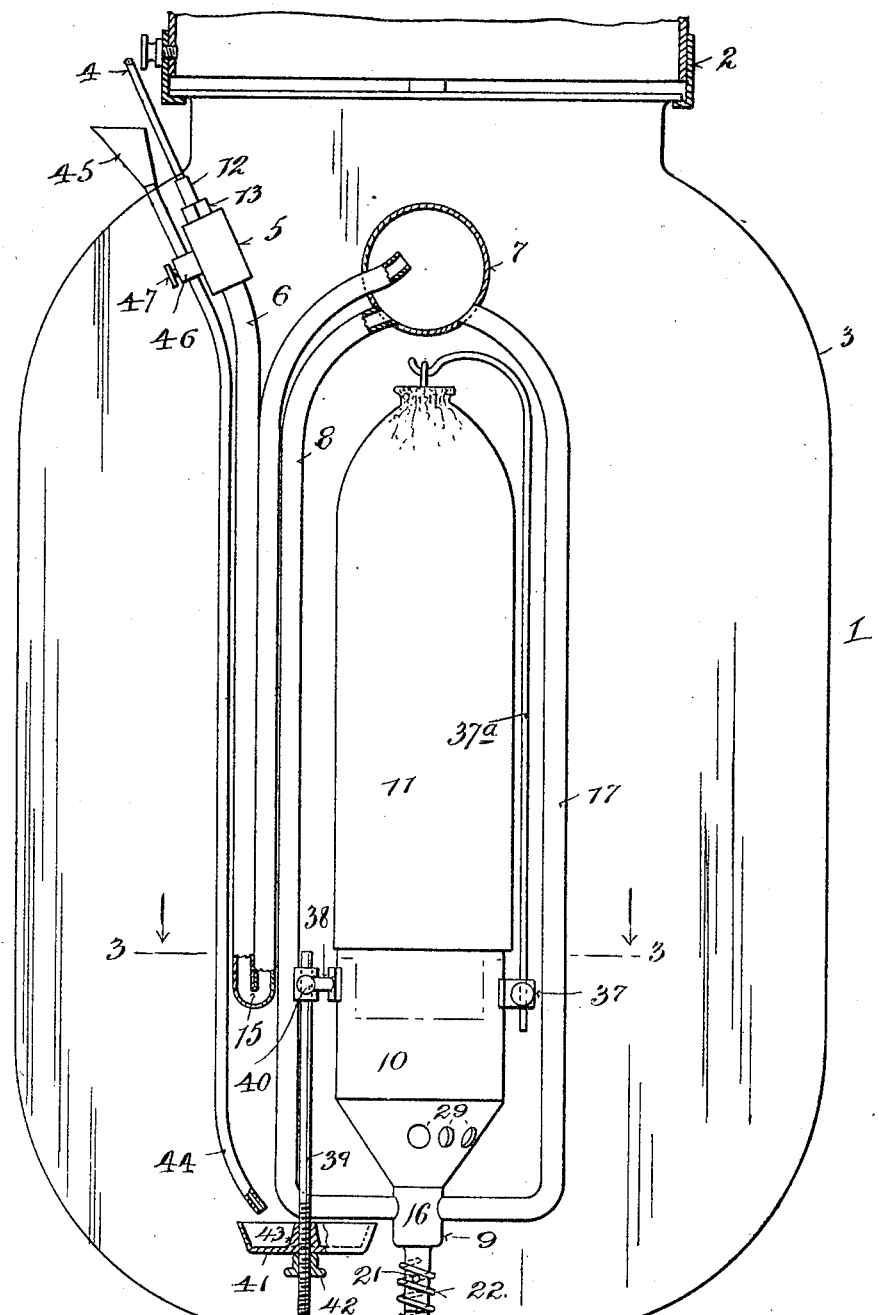

UNITED STATES PATENT OFFICE.

JACOB WILENTZ, OF NEW YORK, N. Y.

KEROSENE-LAMP.

No. 812,249.  Specification of Letters Patent.  Patented Feb. 13, 1906.

Application filed May 2, 1905. Serial No. 258,489.

*To all whom it may concern:*

Be it known that I, JACOB WILENTZ, a subject of the Czar of Russia, and a resident of the city of New York, borough of Manhattan, county of New York, and State of New York, have made a new and useful Improvement in Kerosene Incandescent Lamps, of which the following is a specification, The object of my invention is to provide a strong light at a small cost; and this object is accomplished by means of my invention, one embodiment of which is hereinafter disclosed.

For a more particular description of the same reference is to be had to the accompanying drawings, forming a part hereof, in which—

Figure 1 is a side elevation of a lamp provided with my improvement. Fig. 2 is an enlarged view, partly in section, of the bottom part of the same. Fig. 3 is a sectional view taken on the line 3 3 of Fig. 1. Figs. 4 and 5 are sectional views of a union connection with the oil-supply pipe, Fig. 5 being taken on the line 5 5 of Fig. 4. Fig. 6 is a sectional view showing the needle-valve.

Throughout the various views of the drawings similar reference characters designate similar parts.

This lamp 1 is provided with any suitable flue 2 and chimney 3. As both flues and chimneys have long been used on lamps, a detailed description of them is unnecessary.

The kerosene-oil is supplied to the lamp 1 through a tube or duct 4, union 5, U-tube 6, heater 7, and side pipe 8 to the needle-valve 9 and burner 10. The products of combustion heat the mantle 11 to a state of high incandescence.

The union 5 has a nozzle 12, surrounded by a nut 13 and the rectangular case 14, which is fixed to the U-tube 6. This tube 6 is bent so as to cause the kerosene to flow downwardly to a point 15, which is preferably in a plane below the top of the burner 10, and from this point 15 the tube is bent back upon itself and follows the tube 8 to the heater 7, into which it extends at a point a little above their junction. This heater 7 may be given any suitable form, but is preferably made spherical.

The tube 8 is preferably shaped as shown in Fig. 1 and extends downwardly to the level of the valve 9, where it is bent horizontally and enters the casing 16 of this valve 9. This casing 16 is supported on one side by the tube 8 and on the other by a similar tube or rod 17, which connects it with the heater 7. If the part 17 is made tubular, it is preferably plugged, so that no gas will pass through it. The casing 16 is provided with a bore 18 for a needle-valve stem 19, which fits against a seat in a plug 20, screwed into the upper end of the bore 18. A lug 21 is fixed near the lower end of the casing 16, which lug engages a helical wire 22, fixed to a handle 23, which is provided with a bore 24, that receives the stem 19. A set-screw 25 holds these parts together. A packing 26 surrounds this stem 19 and is fixed in the lower end of the bore 18 by any suitable means, such as a stuffing-box 27.

The upper end of the casing 16 is flared to form the burner 10. This flared portion may be either integral with the casing 16, as shown, or made separate, as desired. The flared portion 28 on the side away from the tube 8 is provided with openings 29 for the admission of air. The upper end of the flared part 28 is closed by a diaphragm 30, which is imperforate except for a center hole 31, surrounded by an upwardly-extending tube 32, which rises a distance approximating twice its diameter, the precise distance being immaterial, which tube is covered by a cap 33, slightly flared at its lower end and provided with perforations 34, through which the mixed air and gas pass. The space between the tube 32 and cap 33 is sufficient to enable a free flow of the gases. Above the flared part 28 extends the cylinder 35, which incloses the cap 33 and extends above the same to the gauze 36, which surmounts it in the usual way. On each side of the cylinder 35 are perforated lugs, one, 37, for the wire 37ª, which supports the mantle 11 in the usual manner, and the other, 38, for an auxiliary heating means. This means consists of a rod 39, screw-threaded at its lower end and fixed by a set-screw 40 in the lug 38 at its upper. The pan 41 is placed on this rod 39 and held by a nut 42 immediately under the horizontal portion of the tube 8. To enable the pan 41 to be held in this way, it is provided with a central boss 43, which is perforated to fit the rod 39. A small tube 44 extends from above the pan 41 and runs along the tube 6 and union 5 to a point outside the globe 3, where it is expanded to form a funnel 45. A lug 46 with a set-screw 47 holds this tube 41 in place, and this lug is preferably formed integral with the union 5, as shown.

From the foregoing the operation of my improved lamp will be readily understood. Assuming the parts to be in the position indicated in Fig. 1, alcohol or other inflammable liquid of a similar nature is poured in the funnel 45 and through the tube 44 to the pan 41, and at the same time kerosene-oil under pressure is supplied to the lamp 1 through the tube 4. The alcohol in the pan 41 is then ignited and vaporizes the oil in the tubes 6 and 8 and soon burns out and ceases to perform any further function. The vapor passes through the needle-valve 9, burner 10, and gauze 36, and is ignited above the same and heats the mantle 11. After issuing from the check 20 the vapor becomes mixed with air, which enters the flared portion 28 through the perforation 29, and the mixed gases that pass through the central opening 31, tube 32, under the cap 33, through openings 34, and thence upwardly through the space between the cap 33 and tube 35, through the gauze 36 to the point of combustion, as described above. This tortuous passage through which the mixed gases pass causes their thorough mixture, so that they burn with a complete and perfect combustion. The products of combustion heat the heater 7 and vaporize the incoming oil, so that the lamp will burn indefinitely. When the lamp has burned sufficiently, it is extinguished by closing the needle-valve 9 and the lamp may be relighted, as described above. The flue 2 and chimney 3 are so arranged and proportioned that a suitable draft is maintained, the air necessary for combustion entering the chimney through an opening about the key 23.

In the foregoing I have described one embodiment of my invention. It is obvious that many others may be made which employ its essential characteristics, so that I do not regard it as limited to the form above described, but as broad enough to cover all structures that come within the scope of the annexed claims.

What I claim is—

1. In an article of the class described a burner comprising a flared portion having perforations in one side only and covered by a centrally-perforated diaphragm, a tube extending about said central perforation, a cap having a serrated lower edge covering said tube, and a cylinder surmounting said flared portion and surrounding said cap.

2. In an article of the class described, a burner comprising a flared lower portion, a cylindrical tube surmounting said flaring portion, a gauze surmounting said tube, a perforated plate fixed to said flared portion at its top, a tube fixed to said plate and inclosing said opening, and a cap with serrations in its lower edges, inclosing said last-mentioned tube.

In testimony whereof I have signed my name to this specification in the presence of two subscribing witnesses.

JACOB WILENTZ.

Witnesses:
RICHARD M. GLIDE,
A. M. BRADLEY.